United States Patent [19]
Jones et al.

[11] Patent Number: 5,797,133
[45] Date of Patent: Aug. 18, 1998

[54] METHOD FOR AUTOMATICALLY DETERMINING THE APPROVAL STATUS OF A POTENTIAL BORROWER

[75] Inventors: Robert Mebane Jones, Atlanta; Charles Frederick Goetz, Marietta, both of Ga.

[73] Assignee: Strategic Solutions Group, Inc., Atlanta, Ga.

[21] Appl. No.: 794,142

[22] Filed: Feb. 3, 1997

Related U.S. Application Data

[63] Continuation of Ser. No. 298,794, Aug. 31, 1994, abandoned.

[51] Int. Cl.$^6$ ................................................. G06F 157/00
[52] U.S. Cl. ................................................. 705/38; 705/35
[58] Field of Search ................................. 395/201, 235, 395/238, 242; 235/379; 283/57; 379/93, 96, 102, 111, 116, 164; 340/825.54; 705/1, 35, 38

[56] References Cited

U.S. PATENT DOCUMENTS

| | | | |
|---|---|---|---|
| 4,866,756 | 9/1989 | Crane et al. | 379/88 |
| 5,164,981 | 11/1992 | Mitchell et al. | 379/88 |
| 5,239,462 | 8/1993 | Jones et al. | 364/408 |
| 5,276,731 | 1/1994 | Arbel et al. | 379/88 |

OTHER PUBLICATIONS

Bank New Product News, p. 26, Sep., 1991, Dialog file 16, Accession No. 03380829.

Northern Tel's Meridian 1 Meridian Link Business Communications Products Launched in Japan, Edge, Apr. 8, 1991.

Stetenfeld, Beth, "Lending the Right Loan System Loan Automation Buyer's Guide", Credit Union Management V15N7 pp. 28–39 Jul. 1992 Acc# 00728366 File 15.

"University Support Services Announces State–of the–Art Loan Application and Processing Service for Education Borrowers", PR Newswire Association Inc., Jul. 1993. Dialog Acc# 0612997.

"Facsimiles of the Future", Bank Technology News, Feb. 7, 1994 p. 28: Dialog Acc# 04950532.

"Mortgage Firm Reacto Fast With Net Services", Network World, Feb. 29, 1988, pp. 21, 23.

*Primary Examiner*—Frantzy Poinvil
*Attorney, Agent, or Firm*—Bernstein & Associates

[57] ABSTRACT

A method is provided for the real-time automatic determination of the approval status of a potential borrower of a loan. The method of acquiring information from the potential borrower includes the steps of (1) detecting the change in a data stream of a trunk link routed telephone call; (2) answering the call initiated by the potential borrower; (3) determining the DNIS; (4) choosing a proper lender script from a library; (5) starting the script, the script being a series of pre-recorded voice messages which are questions, statements and/or instructions; (6) receiving the DTMF tones transmitted by the telephone keypad button pressed by the caller in response to a question; (7) translating the tones into the numerical values; (8) storing the values in a data processor; (9) terminating the call; and, (10) resetting the system for the next call. The method of determining the approval status and credit limit of the potential borrower includes the steps of: (11) automatically determining the approval status of the potential borrower according to criteria provided by a lender, including utilizing the predefined information in this determination, and information received by accessing a credit bureau; and (12) automatically transmitting information regarding the approval status back to the dealer and/or lender. Additionally, prior to determining the approval status of the potential borrower, the method may include (13) automatically transmitting information identifying the potential borrower to a data processing system maintained by a credit bureau; (14) automatically selecting financial information regarding the potential borrower from the data stored by the credit bureau and transmitting it to the control location; and (15) automatically utilizing this information obtained from the credit bureau in determining the approval status of the potential borrower.

17 Claims, 2 Drawing Sheets

5,797,133

1

METHOD FOR AUTOMATICALLY DETERMINING THE APPROVAL STATUS OF A POTENTIAL BORROWER

This application is a continuation of application Ser. No. 08/298,794 filed on Aug. 31, 1994, now abadoned.

BACKGROUND OF THE INVENTION

The present invention relates to methods and apparatus for automatically determining the approval status of a potential borrower with respect to a loan, particularly commercial or mortgage loans. In particular, the present invention relates to a computer-automated method and system for determining the approval status of a potential borrower in which a borrower calls a telephone number and responds to questions provided in the form of prerecorded voice messages by pressing buttons on a standard telephone keypad corresponding to the number or letter of choices stated in the messages relating to the potential borrower. The tones generated by the telephone are received and interpreted at a control location by a data processor and a real-time response is automatically sent to the proper parties regarding the approval status.

Generally, determination of the approval status of a potential borrower for a loan has been accomplished either by conventional manual processes or by using a computer-based system. Using the context of consumer loan lending to illustrate these processes, the potential borrower first selects the product in which he/she is interested. The manual determination processes typically require that the potential borrower fill out a lengthy loan application form, submit this form to the lender and wait several days for the application to be processed by the originator. During this processing period, the steps of assembling and processing of the information required to make a lending decision are carried out manually. These tasks typically include: (1) calling a credit bureau to access a credit report; (2) scoring the credit worthiness of the applicant, in most cases manually, and making a subjective judgment; and (3) determining whether the requested amount of the loan falls within the bounds of a maximum multiplier of the potential borrower's income. Generally, at this point, the potential borrower would be notified if there were any problems concerning approval of a loan and, thus, could infer if he/she had a good or bad chance of ultimately securing a loan from the lender.

However, these methods are less than satisfactory because of inefficiencies and confidentiality problems. That is, the process of determining if the potential borrower can obtain a loan is not completed until after considerable time is spent selecting and negotiating the product; if the potential borrower is denied the loan, the time spent selecting and negotiating is wasted. Further, the process of determining if the potential borrower can obtain a loan typically takes at least two to five days, which may limit the potential borrower's options. In addition, this process involves disclosure of sensitive information to several people, including the originator.

Computer-based systems have been developed that require the potential borrower or product dealer to input information relating to the potential borrower's ability to acquire a loan, such as his/her social security number, income and expenses, directly into a computer. The computer then performs a credit scoring and credit checking analysis to determine whether the potential borrower is eligible for a loan.

However, because many individuals are intimidated by computers, these computer-based services frequently are not used. Further, use of computer-based systems generally requires training someone, such as the dealer's assistant or salesperson, how to use the system, which requires a significant investment in time and resources. In addition, as with the manual processes, sensitive information is usually required to be shared with another person, such as the dealer, to input the information; prospective purchases may shy away from providing this information to another or may provide incorrect information depending upon the buyer's relationship with the dealer.

Thus, there exists a need for a method and apparatus for automatically providing a fast response to a potential borrower's inquiry regarding his/her approval status for a loan that does not require the potential borrower, or another person, to input sensitive data related to the potential borrower's ability to obtain a loan into a computer. There also exists a need for an improved method, and associated apparatus, for automatically receiving information over the telephone lines in response to pre-recorded questions which can be interpreted by a data processing system and used to determine the approval status of a potential borrower.

The present invention represents an improvement over U.S. Pat. No. 5,239,462, issued Aug. 24, 1993, the disclosure of which is incorporated by reference herein in its entirety. This patent uses a facsimile-based front end in which the potential borrower completes an optically scannable form by making black marks where indicated to represent the borrower's information. The form is faxed to the central location to be scanned and interpreted by a data processor. This information is used to determine the approval status and credit limit of the borrower. While the technology associated with the invention of that patent has proven to be successful, the technology has limitations regarding error correction and the ability of borrowers to complete the forms properly. It would be desirable to have a user interface that requires little training and little margin for making unalterable errors. Such an interface would confirm suspected errors in real time with the borrower to ensure proper information is accessed and an approval status can be determined.

SUMMARY OF THE INVENTION

In accordance with one aspect of the instant invention, a method and associated apparatus is provided for determining the approval status of a potential borrower, including whether the potential borrower is pre-approved or pre-qualified for a loan, in which unnecessary disclosure of sensitive information to persons, such as product dealers, regarding a potential borrower's ability to obtain a loan is not required. Furthermore, because the acquisition and interpretation of credit information, preferably including information from a credit bureau, and the approval status determination steps are controlled by a computer, the instant invention provides for a real-time response to the potential borrower regarding his/her approval status, preferably within approximately 30 minutes, more preferably within 10 minutes, still more preferably within 5 minutes, most preferably within 3 minutes. The method of acquiring information from the potential borrower includes the steps of (1) detecting the change in a data stream of a trunk link routed telephone call; (2) answering the call initiated by the potential borrower; (3) determining the DNIS; (4) choosing a proper lender script from a library; (5) starting the script, the script being a series of pre-recorded voice messages which are questions, statements and/or instructions; (6) receiving the DTMF tones transmitted by the telephone keypad button pressed by the caller in response to a question; (7) translating the tones received into the numerical values; (8) storing the values in a data processor; (9) terminating the call; and, (10) resetting the system for the next call.

The method of determining the approval status and credit limit of the potential borrower includes the steps of: (11) automatically determining the approval status of the potential borrower according to criteria provided by a lender, including utilizing the predefined information in this determination, information received from the borrower and by accessing a credit bureau; and (12) automatically transmitting information regarding the approval status back to the dealer and/or lender. Additionally, prior to determining the approval status of the potential borrower, the method may include (13) automatically transmitting information identifying the potential borrower to a data processing system maintained by a credit bureau; (14) automatically selecting financial information regarding the potential borrower from the data stored by the credit bureau and transmitting it to the control location; and (15) automatically utilizing this information obtained from the credit bureau in determining the approval status of the potential borrower.

Preferred embodiments include automatically transmitting information regarding the approval status of the potential borrower to the lender and providing information regarding the lender's current interest rates to a remote location such as the office of the dealer.

The apparatus of the present invention comprises a data processor which can be a personal computer, a modem, either external or internal to the computer, a fax device, and/or a voice board, either internal or external to the computer.

Thus, it is an object of this invention to provide an interactive telephone line based method and apparatus for automatically providing the real-time automatic determination of the approval status of a potential borrower, including pre-approval for a loan. In particular, it is an object of this invention to provide for immediate determination of the maximum amount of a loan with respect to buying a particular article that the potential borrower can afford and, if appropriate, pre-approve or pre-qualify the potential buyer for this loan. Thus, time wasted looking at inappropriately priced items, such as a house, can be minimized. In addition, this invention does not require the potential borrower, or other persons such as a dealer, to directly interface with a computer, thus minimizing non-use of the invention caused by hesitancy to use a computer. Similarly, because the end user only answers questions received over the telephone by pressing buttons on the telephone keypad, this invention does not require significant training of end users in order for the system to be implemented.

A further object of this invention is to minimize the disclosure of sensitive information relating to the potential borrower's ability to obtain a loan. Because the potential borrower can input information directly over the telephone line, no sharing of sensitive information with others, such as a dealer, need occur.

It is a still further object of the instant invention to decrease the amount of time needed to close the loan or mortgage. Because most of the information needed to originate a loan is already gathered and analyzed by the instant method for real-time determination of the approval status of a potential borrower, such as pre-approval or pre-qualification for a loan, less additional time is necessary to close the loan.

Other objects, features, and advantages of the present invention will become apparent upon reading the following detailed description of embodiments of the invention, when taken in conjunction with the accompanying drawing and the appended claims.

DESCRIPTION OF THE DRAWINGS

The invention is illustrated in the drawings in which like reference characters designate the same or similar elements throughout the figures of which.

DETAILED DESCRIPTION OF THE INVENTION

Figure 1:
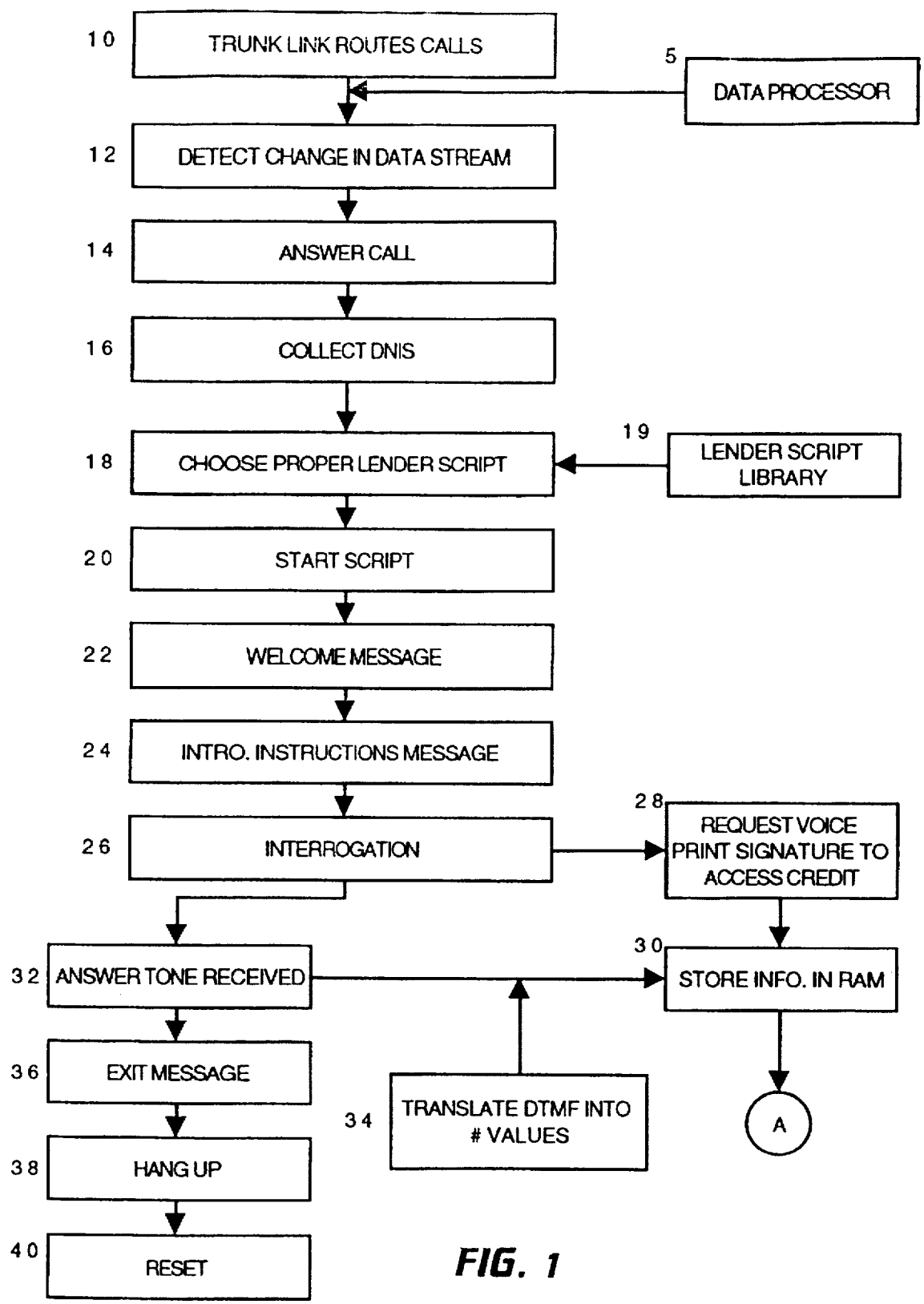
FIG. 1 is a flow chart depicting an embodiment of the data processing methodology and structure for the real-time automatic determination of the approval status of a potential borrower for a loan in accordance with the invention.

As used herein, the term "approval status" refers to the status that would be assigned by a lender to a potential borrower of a loan if the borrower were requesting a loan for a specific amount. This status can be upgraded or lowered depending, for example, upon the completion by the borrower of the lender's remaining requirements, changed conditions that would affect the potential borrower's ability to repay the loan and changed market conditions. "Pre-approved" means that the borrower, except for verification of certain information, is approved for a loan of a specified amount. "Rejected" means that the borrower does not meet the lender's qualifications for obtaining the loan. "Undetermined" means that a status based upon a substantive evaluation of the information relating to the potential borrower's ability to obtain a loan could not be determined because, for example, the potential borrower did not enter the correct keypad tones, an error in transmission or reception occurred or the programmed data processor was unable to determine if the approval status of the borrower is "pre-approved," or "rejected." Typically, a borrower's status advances from pre-qualified to pre-approved to final approval and closing of the loan. As used herein, the term "real-time" is meant to characterize the instant method as one in which, following receipt of the tones generated on the telephone keypad by the potential borrower, each subsequent step automatically follows the previous step without significant delay, thus allowing the potential borrower to receive a prompt response regarding his/her approval status. Typically, the interval between the time the potential borrower finishes transmitting tones to the control location to the time he/she receives a response generated by this method is less than 30 minutes, preferably less than 10 minutes, more preferably less than 5 minutes, most preferably less than 3 minutes. The term "fax" or "facsimile" will be used interchangeably and means a device or method for transmitting information by devices commonly known in the art as "fax machines" or "fax boards."

The present invention can be used in a number of different applications. Any number of different consumer/lender interactions can be utilized, such as, but not limited to, consumer oriented loans by phone, appliance purchases, credit union purchases, in-house loan originations, new account investigation, cross selling other loan products, and the like. In the context of the present invention the term "dealer" shall mean any person or organization which requires information in order to determine whether to extend credit for the purchase of a product or service.

The system for the real-time automatic determination of the approval status of a potential borrower for a loan, such as a real estate mortgage, a refinancing loan, an automobile loan, a personal revolving debt or a general loan, comprises a central computer located at a control location connected to at least one facsimile receiving and telephone unit.

In detailed overview, the method and associated system of the instant invention operates in a preferred embodiment as follows. Referring to FIG. 1, a potential borrower initiates a call on a tone generating telephone or other device, such as, but not limited to, computer-generated data and/or signals transmitted electronically or optically either directly or by a carrier, e.g., a public, commercial or private network, such as CompuServe, InterNet or the like, possibly even using data encryption technology known in the art to protect privacy. The number dialed is pre-assigned for a particular lender. Normally, each lender will have their own number which borrowers can dial. The lender's lending criteria will have already been programmed into a central data processor 5, which can have a number of different lending criteria stored in its memory. A trunk link routes the call at block 10 and the voice card in the data processor 5 detects the change in the data stream at block 12. The data processor 5 answers the call at block 14 and collects the DNIS (Dialed Number Identification), which is the number the caller has dialed. The data processor 5 determines which lender script to access depending on the DNIS. The data processor 5 recognizes the number being dialed as being for a particular lender's criteria and chooses the proper lender script from a script library at block 19.

The script is initiated at block 20. The scripts are a series of pre-recorded voice messages, such as greetings, questions or instructions. A welcome message is played at block 22. An introductory message at block 24 is played which provides basic instructions to the caller on how to use the system. A set of questions at block 26 is then played over the telephone to the caller. The caller answers the questions by pressing various keys on the telephone keypad. Such questions may request information about the caller's social security number, address, birthdate, type of loan desired, amount of financing desired, cost of the item to be financed, the caller's monthly costs of living, total annual income, years at present job, and other questions designed to be inputted into a set of calculations to determine the credit-worthiness of the borrower. Such question regimens are known in the art. The software contains error detection and correction methods to determine whether a question has been answered reasonably or correctly, as will be described more fully hereinbelow.

The data processor 5 can optionally play a message that request a voice print signature to access credit at block 28. If this feature is utilized, the data processor 5 can record the voice authorization provided by the caller into RAM at block 30. As the caller answers the question messages at block 26, the answer tones are automatically received at block 32 and translated by the software of the voice boards (available from Dialogic Corporation, Parsippany, N.J.) into their numerical values at block 34. After the final question message is played and the answer received, an exit/good-bye message is played at block 36. The data processor 5 then terminates the call at block 38 and resets for the next call at block 40.

Figure 2:
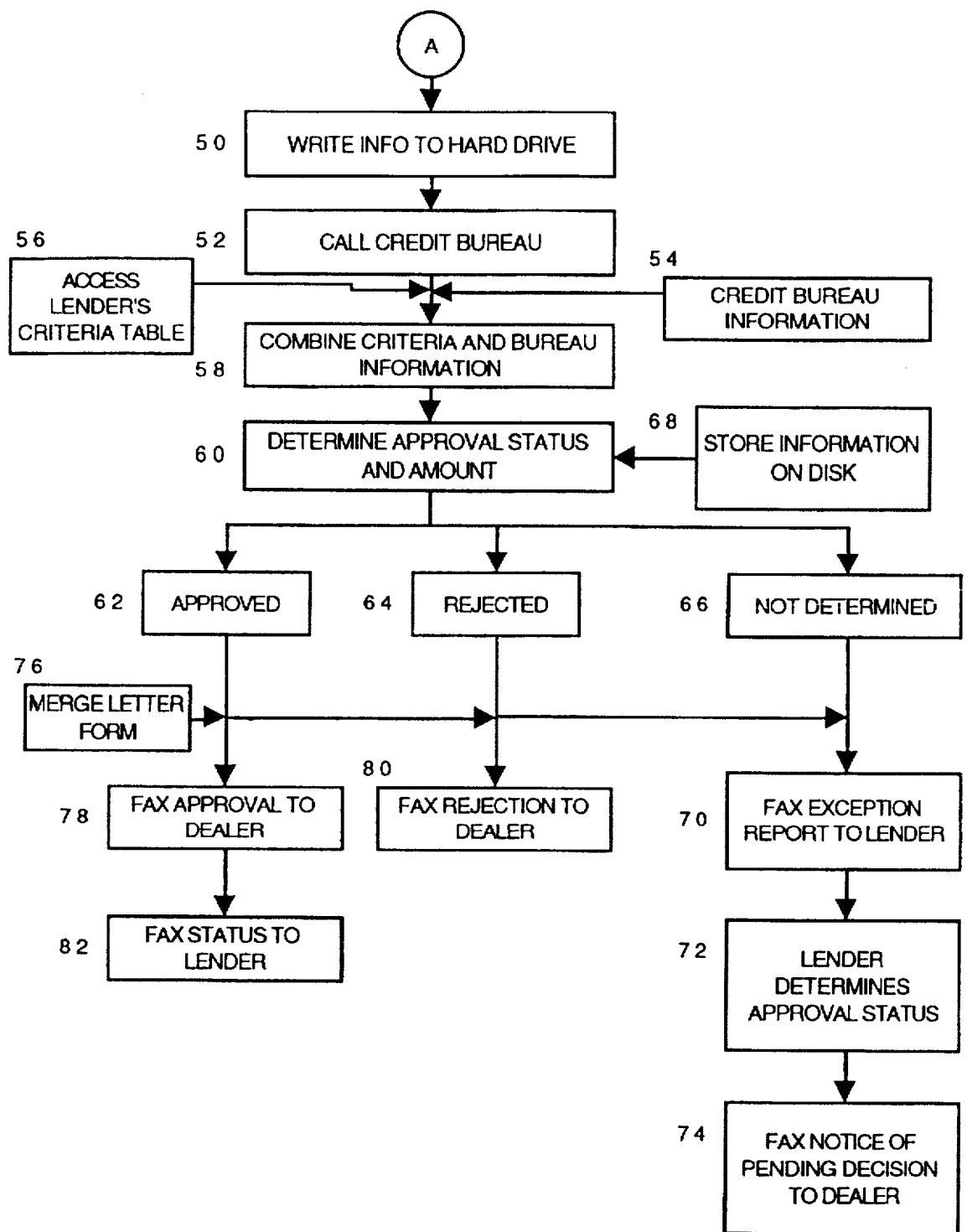
FIG. 2 is a continuation of the flow chart of FIG. 1.

As shown in FIG. 2, the information received into RAM during the call at block 30 is transferred onto a storage device (e.g., magnetic hard drive or optical drives) at block 50 connected to the data processor 5. The data processor 5 then processes the information contained in the memory.

The data processor 5 preferably automatically accesses a credit bureau data processing system at block 52, using at least some predefined information received from the call, such as the potential borrower's social security number, to extract stored financial information regarding the potential borrower from the data file of stored financial information in the credit bureau data processing system at block 52. Such action can be accomplished by directing a modem associated with the data processor 5 to call or access an open line to the credit bureau system and supplying or receiving any needed passwords and/or commands to or from the credit bureau system. This information is then automatically transmitted to the data processor 5 of the instant invention. For instance, the computer of the instant invention may, using the social security number of the potential borrower, call the credit bureau and interface appropriately with the software controlling the credit bureau data processing system to select the credit profile of the potential borrower and to interpret the information obtained from the credit bureau. Preferably, a piece of predefined information, such as the borrower's zip code, that is not used to access the credit bureau is obtained from the credit bureau so that the computer can verify that the correct credit profile is selected. Typically, the credit information obtained in this manner from the credit bureau includes a score relating to the credit worthiness of the potential borrower, or can be scored at the control location by the data processor 5. The present invention can also incorporate a voice feedback system to verify that the correct person's information was accessed at the credit bureau.

The lender's lending criteria is accessed at block 56 that is stored in the data processor 5. The credit bureau information and the data processor 5, using the predetermined information and, preferably, the selected stored financial information regarding the potential borrower obtained from the credit bureau, then determines the approval status of the potential borrower according to criteria provided by a lender, including the maximum amount of a loan available based upon criteria provided by the lender. For instance, the credit worthiness score obtained from the credit bureau may be compared to a table of score ranges obtained from the lender and located in a data file accessible to the programmed data processor to determine whether the borrower is pre-approved (block 62), rejected (block 64) or the status cannot be determined with the information provided (block 66) and the maximum amount of a loan available to the potential borrower from the lender may be determined by using a predetermined formula which includes the potential borrower's income and debt information. The status and credit limit are stored on the hard drive of the data processor 5 at block 68.

At block 66, if the programmed data processor is unable to determine whether the potential borrower is pre-approved or rejected based upon the predetermined information and/or information from the credit bureau (block 54), the system, at block 70, automatically sends an exception report by facsimile transmission to the lender that includes the predetermined information and/or the selected stored financial information obtained from the credit bureau for further approval status determination by a lending official at block 72. The dealer is also notified at block 74 by facsimile transmission that the approval status decision is pending. The lending official may then determine the approval status manually (block 72) and send the approval status determination to the borrower, such as by facsimile transmission.

The data processor 5 then selects a particular notice of approval status form letter appropriate for the particular potential borrower from a data file at block 76 accessible to the data processor and creates a notice letter with appropriate wording. For instance, the letter may be addressed to the potential borrower; identify the lender; describe the borrower's approval status, including the maximum loan amount available for differing payback times; describe what, if any, additional steps the borrower must undertake to gain approval of the loan; verify the information the potential borrower transmitted and/or request more information from the borrower.

The notice letter is then automatically sent to the dealer (blocks 78 and 80), typically by being placed in an outbound queue and routed to a fax board, from which the fax board, by means of its on-board firmware in conjunction with software running on the data processor 5 software, automatically places the call to the dealer and transmits the letter by facsimile transmission. An additional copy of the approval status letter or a different version summarizing the information contained in the status letter is sent to the lender automatically at block 82. These procedures allow for immediate follow-up by the lender with the potential borrower. Using an MS-DOS PC computer with at least 4 megabytes of RAM memory, for the usual case, it typically takes about 30 seconds to obtain credit bureau information (block 54) after all tone data is received, about one second to determine the approval status of the potential borrower (block 60) and about 60 seconds to transmit the notice of approval status to the potential borrower (blocks 78 and 80), leading to an approximate overall time of about 91 seconds. Notifying the lender of the approval status of the borrower (block 74) typically takes an additional 60 seconds. Obviously, for a particular case, these times might be shorter, or, particularly if an exception report is required (block 70) or other difficulties are experienced, these times could be longer.

The data processor 5 may access and input current daily interest rates of the lender into a data file at block 84 for use in determining the approval status of the potential borrower or for dissemination to dealers either automatically or upon request.

The modem employed may be any modem that is compatible with the data processor and the credit bureau data processing system, preferably by a direct link to the credit bureau using private phone lines and high speed modems. The fax board employed can be any fax board that is compatible with the data processor, preferably a Dialogic Fax Board.

The present invention incorporates error detection means when receiving the tone data to determine the accuracy of certain information inputted by the caller. The error detection means incorporates several types of methods, depending upon the data to be involved. One method is to detect incomplete data, such as receiving only four digits of a five digit zip code. In this case a voice message is actuated to direct the caller to re-input the information. A second method is to detect out of bounds data, such as annual income, loan amount and the like. In this case the data processor 5 contains logic parameters that involve any of several possible formulae, each with boundary limits. An example of this is the loan amount requested compared to the purchase price of the item. If the loan amount inputted by the caller is higher than the purchase price, an error is detected and a voice message is actuated to request reentry of the relevant data by the caller. Another example is the amount of the loan requested and the caller's annual income. If the loan amount is more than a certain percentage of the annual income, an error may be detected. For example, if a loan of $70,000 is requested and the annual income is $35,000, the error may be that the borrower actually seeks a $7,000 loan, but keyed in an additional zero. A third error detection method is by examining data for accuracy after it is entered. For example, when the data processor 5 accesses the credit bureau (at block 54) if the social security number does not match up with the caller's address, an error will be detected. Other comparable error detection methods can be used with the present invention and are contemplated for its use.

It is possible to write the software needed to implement the method and system of this invention in one of the available user languages, such as C. Also, some support routines, such as displaying a line on the screen, are also not explicitly written out. However, as would be appreciated by one skilled in the art, these routines (or usable variants of these routines) could be either written or obtained by one skilled in the art. Thus, in light of the description given above for the invention, a skilled programmer, with or without various available software packages and tools, would be able to implement the method and system of this invention without undue experimentation.

Although the instant method and system is illustrated particularly in the context of obtaining a consumer loan, it will be apparent to those skilled in the art how the invention can be adapted, within the scope of the invention, to methods and systems for obtaining other types of loans or to deliver other information involving credit; e.g. opening checking accounts, financial planning, and the like.

In an alternative embodiment, a real-time answer could be provided to the caller by using a voice indexed file to provide a voice message indicating the approval status and amount of the loan approved or other information. Such voice indexed files are known in the art.

In a further alternative embodiment, the dealer or lender can be notified by electronic message or other electronic data communication means Although the present process has been described with reference to specific details of certain embodiments thereof, it is not intended that such details should be regarded as limitations upon the scope of the invention except as and to the extent that they are included in the accompanying claims.

What is claimed is:

1. A method for the automatic determination of the approval status of a caller who is a potential borrower for a loan using a data processing system, comprising the steps of:

(a) monitoring at least one data line at a central control location for an incoming call from the potential borrower;

(b) detecting said incoming call;

(c) establishing a communication link with said incoming call;

(d) transmitting a signal from said control location over said data line;

(e) presenting a set of questions to said caller, such that for each question presented, said caller can respond by entering tone-generated caller information on a standard touch tone keypad;

(f) receiving said tone-generated caller information at said data processing system;

(g) determining the accuracy of said caller's response to said set of questions;

(h) repeating a selected voice script message until accurate caller information is received;

(i) formulating an access code from said tone-generated caller information, said code operable for retrieving from a credit information source caller credit information;

(j) formulating a predetermined data profile of said caller that is different from said access code;

(k) accessing and retrieving said caller's credit information using said code;

(l) comparing and verifying said caller's profile to said caller's credit information thereby insuring informational integrity of retrieved data from said caller's credit information;

(m) interpreting said information at said control location;

(n) automatically determining at said control location the approval status of said caller according to criteria provided by a lender; and (o) automatically transmitting information regarding the approval status from said control location to a remote location.

2. The method of claim 1, wherein said data line is a telephone line.

3. The method of claim 1, wherein said data line is a cable for transmitting electronic information.

4. The method of claim 1, wherein said control location comprises a data processor.

5. The method of claim 1, wherein in step (b) said call is detected by monitoring and detecting a change in the data stream in said data line.

6. The method of claim 1, wherein said signal in step (d) said signal is at least one prerecorded voice message.

7. The method of claim 6, wherein said at least one voice message is selected from a script of prerecorded voice messages.

8. The method of claim 7, wherein said voice messages are selected from the group consisting of questions, statements and instructions.

9. The method of claim 1, wherein in step m said interpretation includes the step of translating said tones into their correlated number values.

10. The method of claim 1, wherein said information in step m is stored in memory in said control location.

11. The method of claim 1, further comprising at least one tone transmitted by said caller in response to said questions identify said caller.

12. The method of claim 1, further comprising at least one tone transmitted by said caller in response to questions determine the type and terms of loan products sought by said caller.

13. The method of claim 1, further comprising the steps of:

(aa) prior to said determining step (h), accessing credit information at a credit bureau;

(bb) querying said credit bureau for information concerning said borrower using said interpreted information in step m;

(cc) automatically selecting stored financial information regarding said potential borrower from a data file of said stored financial information located at said credit bureau;

(dd) automatically receiving said selected stored financial information regarding said potential borrower from said credit bureau at said control location; and (ee) automatically utilizing said selected stored financial information in said determining step (h).

14. The method of claim 1, wherein said step of automatically transmitting information regarding said approval status comprises automatically creating an image of said information and transmitting said image of said information to said remote location by facsimile transmission.

15. The method of claim 1, wherein said loan is selected from the group consisting of a real estate mortgage loan, a consumer loan, a refinancing loan, an automobile loan, a personal revolving debt loan and a general loan.

16. The method of claim 1, further comprising the step of updating said criteria provided by said lender.

17. The method of claim 1, further comprising the step of transmitting current interest rates of said lender from said control location to a remote location.

* * * * *